(12) United States Patent
Wang et al.

(10) Patent No.: US 12,445,167 B2
(45) Date of Patent: Oct. 14, 2025

(54) TRANSMISSION OF TIME SENSITIVE SIGNAL

(71) Applicant: Hewlett Packard Enterprise Development LP, Spring, TX (US)

(72) Inventors: Bo Wang, Beijing (CN); Jiguang Zheng, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 156 days.

(21) Appl. No.: 18/544,706

(22) Filed: Dec. 19, 2023

(65) Prior Publication Data
US 2025/0202526 A1    Jun. 19, 2025

(51) Int. Cl.
*H04B 3/54* (2006.01)
*H04B 1/16* (2006.01)

(52) U.S. Cl.
CPC ............. *H04B 3/54* (2013.01); *H04B 1/1615* (2013.01)

(58) Field of Classification Search
CPC ................................ H04B 3/54; H04B 1/1615
See application file for complete search history.

(56) References Cited

U.S. PATENT DOCUMENTS

| | | | |
|---|---|---|---|
| 11,463,369 B2 * | 10/2022 | Muraoka | H04L 43/16 |
| 2021/0218686 A1 * | 7/2021 | Galeev | H04L 43/08 |
| 2022/0022245 A1 * | 1/2022 | Dudda | H04W 72/23 |

* cited by examiner

*Primary Examiner* — David S Huang
(74) *Attorney, Agent, or Firm* — King & Wood Mallesons

(57) ABSTRACT

Implementations of the present disclosure relate to a system for transmitting time-sensitive signals between an access point (AP) and a universal serial bus (USB) dongle device inserted into the AP. The AP is configured to generate a time-sensitive signal and comprises a modulator configured to obtain the TSS and two power voltages and modulate the TSS with the two power voltages to generate a modulated TSS. The USB dongle device operates at the same frequency as the AP and comprises a demodulator for demodulating the modulated TSS to obtain the demodulated TSS, wherein the modulated TSS is transmitted via a power supply pin at the USB interface of the AP and a power reception pin of the USB dongle device. In this manner, the delay of the demodulated TSS relative to the original TSS can be low, fixed, and measurable.

20 Claims, 5 Drawing Sheets

TRANSMISSION OF TIME SENSITIVE SIGNAL

BACKGROUND

Recently, more and more different types of communication devices, for example, WIFI device, Blue-tooth device, fourth-generation (4G) communicating device, and fifth-generation (5G) communication device, are located in a same place, for example, located in a same room. These co-located different communication devices may be designed to operate at a same frequency and thus may interfere with each other.

With the development of communication technology, these different types of communication devices may also be designed to support a time-sensitive network (TSN). As such, time-sensitive signals (TSS) are required to be transmitted between these devices having the same operation frequency band such that these devices may operate according to the TSS and meet the time requirement of related TSN protocols.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
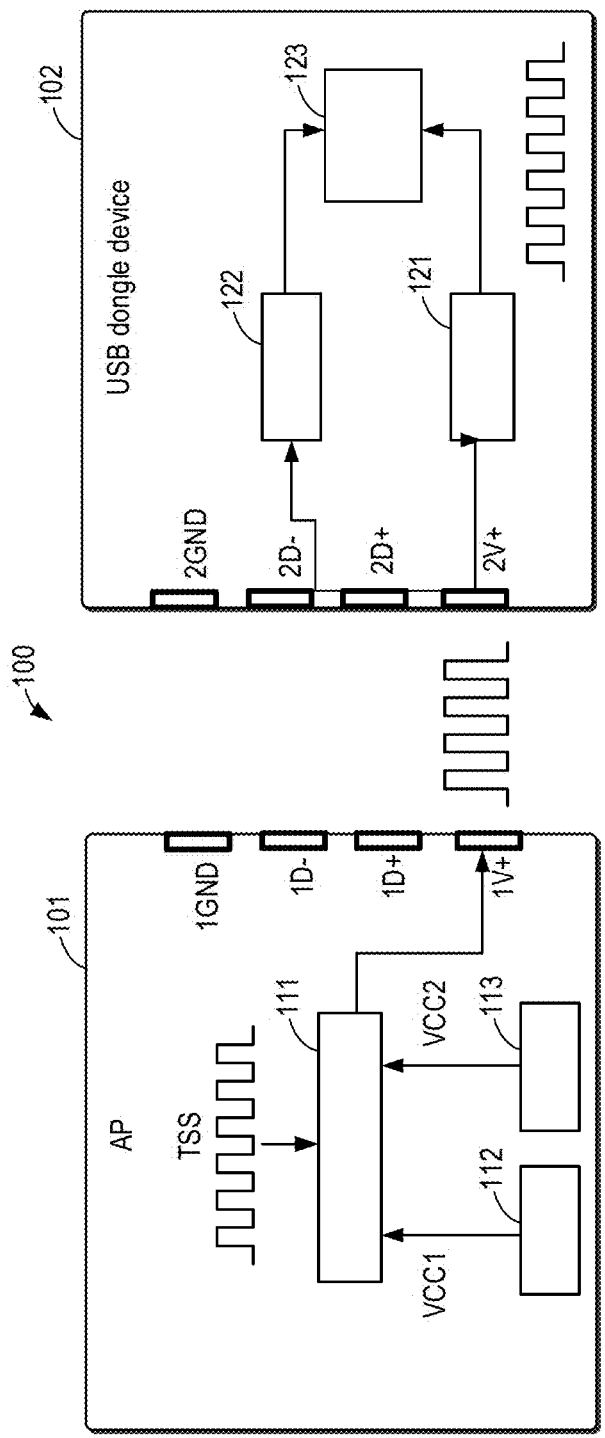
FIG. 1 is a schematic diagram illustrating an example environment in which example implementations of the present disclosure may be implemented.

A time-sensitive network (TSN) is a network protocol used to connect industrial equipment to ensure time synchronization and real-time performance for efficient and accurate control and monitoring in manufacturing, energy, transportation, and the like. TSN optimizes network transmission and processing mechanisms to ensure that time-sensitive data (such as video, audio, and sensor data) may be transmitted quickly, in real-time, and accurately across the network. It employs a range of technologies to achieve this, including time synchronization, flow control, priority scheduling, and the like. Wireless access points (APs) may support the TSN protocol for transmitting time-sensitive data in wireless environments.

In some scenarios, different types of communication devices, for example, Wi-Fi device, Blue-tooth device, fourth generation (4G) communicating device, and fifth generation (5G) communication device, are located in a same place. For example, Universal Serial Bus (USB) dongle devices are typically plugged into a USB interface on the access point (AP) for some extended functionality. The USB dongle device may be extended as a Bluetooth device, a WIFI device, or even a micro-transmitter base station, for example, a 4G or 5G base station. The Bluetooth devices typically operate at the 2.4 GHz. The WIFI devices may operate at the 2.4 GHZ, 5 GHZ, or 6 GHz. For example, the USB dongle device may be used as a USB-adapted RF scanner or a USB-adapted ultra-bandwidth device.

In this case, the USB dongle device acts as a slave device, and the AP acts as a master device. If different communication devices are required to support TSN, a time-sensitive signal (TSS) needs to be transmitted between two communication systems (or two communication devices) with low latency and without impact on other data transmission. For example, the TSS may be used as a control signal from the master device to the slave device. In addition, the TSS may be used as a time synchronization signal between the master device and the slave device.

The USB interface on an AP usually includes type A and type B, and both of them comprise four pins, namely the power pin V+, the ground pin GND, and the two data pins D+ and D− for transmitting data. Similarly, USB dongle devices include the same type of USB interface. Traditionally, data pins D+ and D− are used to transfer data between APs and USB dongle devices. The data pins D+ and D− of the USB interface on the AP require the signal representing the serial data to be modulated using a specific protocol. Then, the corresponding data pins D+ and D− of the interface on the USB dongle device also need to demodulate the signal using that specific protocol. When using a specific protocol to modulate and demodulate a signal, extracting the TSS from the serial data transmitted by data pins D+ and D− requires operations at the MAC layer or even higher. Thus, the latency of the transmission of TSS is uncertain or not fixed, and even quite high. In addition, the time of serial-to-parallel conversion is also uncertain. Therefore, the serial data path comprising data pins D+ and D− is not suitable for transmitting TSS.

When the TSS is used as a control signal for USB dongle devices, the transmission power-on ramp measurement verifies that the transmission power reaches 90% of the maximum power within a 2 microsecond envelope according to IEEE 802.11 standard. Transmission power-off ramp measurement verifies that the transmitted power drops to 10% of maximum power within a 2 microsecond envelope according to IEEE 802.11 standard. According to the protocol standard, the transmission power-on ramp is required to be not greater than 2 microseconds, and the transmission power-off ramp is also required to be not greater than 2 microseconds. This ensures that the burst power is turned on/off at the proper rate. For LTE, according to the 3GPP TS36.104 standards, the time of the rising and falling edges should not be greater than 17 microseconds. In time division duplex mode, fast rise and fall times are required, so the control signal of the USB dongle device is time-sensitive, which can ensure the fast transmission and reception of data at the USB dongle device.

For example, in the implementation where the USB dongle device is a USB RF scanner, and the real-time status of the master device (e.g., the AP into which the USB RF scanner is plugged) needs to be notified to the USB RF scanner, the delay in the transmission of control signals from the AP to the USB RF scanner is required to be reduced to enable synchronization between the AP and the USB RF scanner. The USB RF scanner uses the rising or falling edge of the control signal to demodulate the 1 and 0 digital signals. If the TSS-type control signal is modulated and demodulated using a serial data path including data pins D+ and D−, it may change the rising or falling slope of the TSS-type control signal or change the amplitude of the TSS-type control signal, which will cause these TSS-type control signals to fail to meet the time requirements of the rising edge and falling edge specified in the above communication standards. Therefore, it is not feasible to use the existing serial data path to transmit TSS.

Therefore, the implementations of the present disclosure provide a scheme for transmitting time-sensitive signals between AP and the USB dongle device plugged therein. The AP comprises a modulator to modulate the TSS and two power voltages and transmits the modulated TSS via the power pins to the USB dongle device, and the USB dongle device comprises a demodulator to demodulate the modulated TSS to obtain the original TSS. In the system for transmitting TSS according to the present disclosure, the modulated TSS is transmitted and received through the power pins of the USB interface on the AP and the power pins on the USB dongle device, respectively, and the modulated TSS signal is demodulated and extracted on the USB dongle device. Since the power pin is a physical component and is located in the physical layer, on which the signal may be transmitted in real-time, without the need for higher layers such as the Media Access Control (MAC) layer, transport layer, or application layer to participate in the modulation and demodulation of the signal and thus without special protocol, the delay or latency of the demodulated TSS relative to the original TSS is fixed and low. Further, the latency is also measurable such that it may be compensated for subsequent operations.

FIG. 1 is a schematic diagram illustrating an example environment in which example implementations of the present disclosure may be implemented. As shown in FIG. 1, the system 100 includes an access point (AP) 101 and a USB dongle device 102 adapted to be plugged directly into a USB interface on the AP. In some implementations, the USB dongle device 102 may be a USB-adapted RF scanner or a USB-adapted ultra-bandwidth device. The USB dongle device 102 works at the same operating frequency as the AP 101. The USB interface on the AP includes four pins, namely, 1V+, 1D+, 1D−, and 1GND, as shown in FIG. 1, in which the 1V+ pin is used for power supply, the 1D+ and 1D− pins are used to transmit serial data (e.g., differential signals), and the 1GND pin is used to ground. Correspondingly, the USB interface on the USB dongle device also includes the corresponding four pins 2V+, 2D+, 2D− and 2GND.

In some implementations, the AP may comprise a wireless transmitter that transmits a signal in response to a high level of the TSS and receives a signal in response to a low level of the TSS. The TSS may be generated by a control unit of the AP to control the transmission and reception of the wireless transmitter. In this implementation, the USB dongle device may include a USB RF scanner capable of being disabled upon receiving a high level of the TSS when the AP transmits a signal and being enabled upon receiving a low level of the TSS when the AP receives the signal. The USB RF scanner needs to be disabled as soon as the AP starts transmitting signals to prevent the transmitted signal from being received from the AP, as the close proximity of the AP and the USB RF scanner may easily cause channel congestion. In addition, the USB RF scanner needs to be enabled after the AP receives signals from other devices so that the USB RF scanner may also receive signals from other devices and diagnose the received signals to determine if they are attacking signals for the network and thus protect the TSN. Therefore, in the above application scenarios, there is a need for a fixed and small delay between the TSS signal generated by the AP and the TSS signal received by the USB dongle device.

In another implementation, the AP includes a GNSS receiver that is capable of obtaining accurate time based on satellite signals. As devices in TSN, the AP is required to be precisely time-synchronized with the USB dongle device connected thereto, preferably in the sub-microsecond range, i.e., less than 1 microsecond.

As shown in FIG. 1, the AP 101 includes a modulator 111 to acquire the time-sensitive signal (TSS) and two power voltages, VCC1 and VCC2. The first power voltage VCC1 of the two power voltages may be generated by a first power supply 112, while the second power voltage VCC2 may be generated by a second power supply 113. The modulator 111 is configured to modulate the TSS and two power voltages VCC1 and VCC2 to produce a modulated TSS. This modulated TSS is then transmitted from the 1V+ pin to the 2V+ pin when the USB dongle device 102 is plugged into the AP 101, wherein the 1V+ pin is an example of the power supply pin, and the 2V+ pin is an example of the power reception pin. In some implementations, the TSS may be a saw tooth wave that includes both the first and second levels. In some implementations, the first level may be the high level, and the second level may be the low level. In this case, the modulated TSS is a saw tooth wave that includes alternating first power voltage VCC1 and second power voltage VCC2. In some implementations, the first power voltage may be higher than the second power voltage.

As shown in FIG. 1, the USB dongle device 102 includes a demodulator 121 that demodulates the modulated TSS to obtain the original TSS. The demodulated TSS is transmitted to a system on chip (SoC) 123 as a control signal for the SoC 123, and the SoC 123 then processes the data according to the TSS. As may be seen from the description above, the modulated TSS is transmitted from the modulator 111 to the demodulator 121 via the power pins on the AP and USB dongle device.

As shown in FIG. 1, a power regulator 122 is provided on the USB dongle device 102 and configured to receive the modulated TSS signal. Since the modulated TSS signal includes alternating first power voltage VCC1 and second power voltage VCC2, the power regulator 122 may regulate the alternating voltages to the constant voltage, and then the constant voltage may be provided to the SOC 123 to power it. That is to say, the power regulator 122 may adjust the voltage supplied to the SOC 123, so that the supply voltage of the SOC 123 is stable, so as to ensure that the SOC 123 may work normally. In some implementations, the power regulator 122 may be, for example, a low-dropout linear regulator (LDO). In another implementation, the power regulator 122 may be, for example, a DC-to-DC converter. Neither low-dropout linear regulators nor DC-to-DC converters will affect the accuracy and ripple of their output power. The input voltage range of the power regulator 122 may be within a wide range. For example, the power regulator 122 is able to stabilize the high (e.g., 5.1V) and low (e.g., 4.9V) levels to be a stable voltage of 5V and supply power of 5V to the SoC 123.

In the system 100 of the present disclosure, the power pins used for transmitting TSS are physical components, and the modulator and demodulator used for respectively modulating and demodulating the signal are also physical components, so that the transmission, modulation, and demodulation of the signal do not involve the media access control (MAC) layer or higher layers (e.g., the network layer, transport layer, application layer, etc.), but only the lowest physical layer (e.g., via the power pins), so they are not limited by specific protocols and do not introduce time delays caused by the MAC layer or even higher layers (e.g., software) in this processing. Accordingly, the delay of the demodulated TSS relative to the original TSS is fixed, low, and even measurable, and compensated in subsequent operations. Compared with transmitting the TSS signal via the serial data path, the demodulated TSS with a fixed delay and a small delay may be obtained by transmitting the TSS via the power pins according to the system of the present disclosure.

Figure 2A:
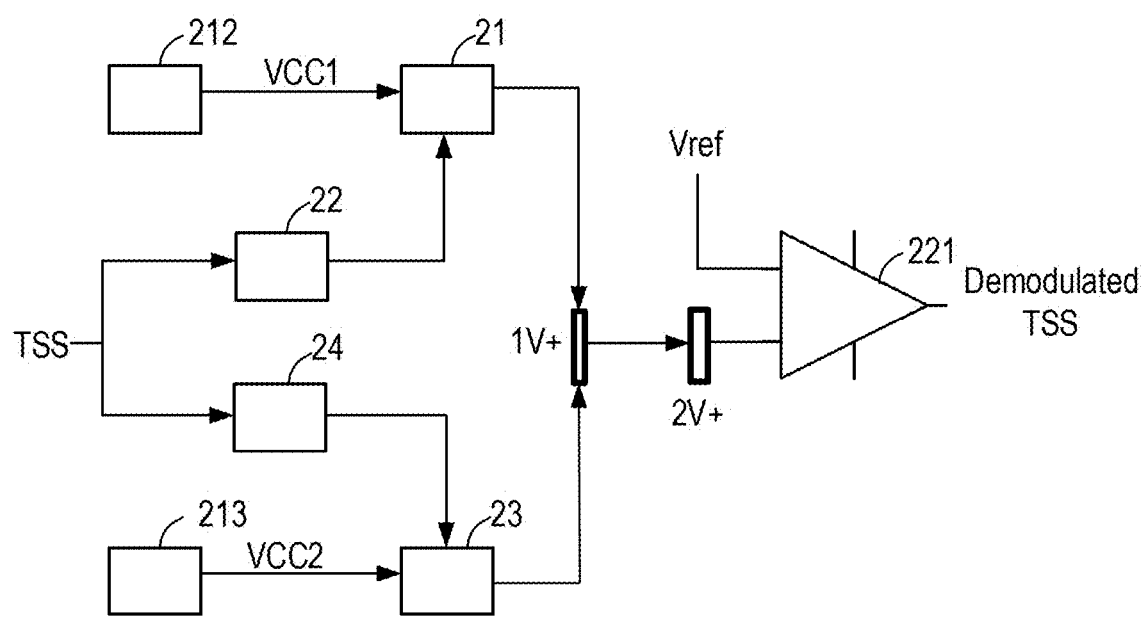
FIG. 2A is a schematic diagram illustrating a connection between a modulator and a demodulator according to the implementations of the present disclosure.

FIG. 2A is a schematic diagram illustrating a connection between a modulator and a demodulator according to the implementations of the present disclosure. The modulator 211 corresponds to the modulator 111 of FIG. 1, the demodulator 221 corresponds to the demodulator 121 of FIG. 1, the first power supply 212 corresponds to the first power supply 112 of FIG. 1, and the second power supply 213 corresponds to the second power supply 113 of FIG. 1.

As shown in FIG. 2A, the modulator 211 includes a first circuit 201 and a second circuit 202. The first circuit 201 is adapted to receive the TSS and the first power voltage VCC1 of the two power voltages, and configured to provide the first power voltage VCC1 to the power supply pin 1V+ when the TSS is at the first level, for example, at a high level. The second circuit 202 is adapted to receive the TSS and the second power voltage VCC2 of the two power voltages, and configured to provide the second power voltage VCC2 to the power supply pin 1V+ when the TSS is the second level, for example, at a low level.

Therefore, the modulated TSS includes alternating voltages VCC1 and VCC2 corresponding to the first level and second level of the original TSS, respectively. That is to say, the modulated TSS has the same period or frequency as the original TSS, since the voltage VCC1 follows the first level and the voltage VCC2 follows the second level. The modulated TSS is provided to the power supply pin 1V+ and then to the power reception pin 2V+ via the physical connection between the two pins. As shown in FIG. 2A, a demodulator 221 is provided to receive the modulated TSS at one input thereof and receive a Vref at the other input thereof, and the Vref is between VCC1 and VCC2.

In some implementations, the input voltage in the range of 4.75V to 5.25V is compliant with USB 2.0 standard. And, VCC1 may be 4.9V. VCC2 may be 5.1V. The Vref may be 5V. In this implementation, the modulated TSS signal has a high level of 5.1V and a low level of 4.9V, enabling high and low voltage switching at power supply pin 1V+ and power reception pin 2V+.

As shown in FIG. 2A, the demodulator 221 may be implemented through a comparator. The demodulator 221 is provided to receive the modulated TSS at one input thereof and receive a Vref at the other input thereof, and the Vref is between VCC1 and VCC2. That is to say, one input of the comparator receives the modulated TSS (e.g., a saw teeth wave signal alternating between high and low voltages) from pin 2V+. The other input of the comparator receives a reference voltage Vref. In some implementations, the Vref may be 5V, e.g., when the voltage of the modulated TSS is below 5V (e.g., 4.9V), the comparator outputs a low level, and when the voltage of the modulated TSS is higher than 5V (e.g., 5.1V), the comparator outputs a high level, thereby demodulating and extracting the original TSS. The reference voltage threshold of 5V of the comparator has sufficient headroom for demodulation of high and low levels.

As shown in FIG. 2A, the first circuit 201 includes a first switch 21 and a first switch control unit 22. The first switch 21 is electrically connected between the first power supply 212 and the power supply pin 1V+. The first switch control unit 22 is connected to the first switch 21 to control it. The first switch control unit 22 may receive the TSS and control the first switch 21 to be switched on to provide the first power voltage VCC1 to the power supply pin 1V+, when the TSS is the first level, for example, the high level. That is to say, when the TSS is at the second level, for example, the low level, the first switch control unit 22 may control the first switch 21 to be switched off such that the first power voltage VCC1 is not supplied to the power supply pin 1V+.

As shown in FIG. 2A, the second circuit 202 includes a second switch 23 and a second switch control unit 24. The second switch 23 is electrically connected between the second power supply 213 and the power supply pin 1V+. The second switch control unit 24 is connected to the second switch 23 to control it. The second switch control unit 24 may receive the TSS and control the second switch 23 to be switched on to provide the second power voltage VCC2 to the power supply pin 1V+, when the TSS is the second level, for example, the low level. That is to say, when the TSS is at the first level, the second switch control unit 24 may control the second switch 23 to be switched off such that the second power voltage VCC2 is not supplied to the power supply pin 1V+.

It should be understood that any circuits, which can achieve the above-mentioned function, i.e., supplying a first power voltage to the power supply pin when the TSS is at the first level and supplying a second power voltage to the power supply pin when the TSS is at the second level, may fall into the protection scope of the present disclosure. Hereinafter, a detailed structure for the first circuit and the second circuit will be described with reference to FIG. 2B.

Figure 2B:
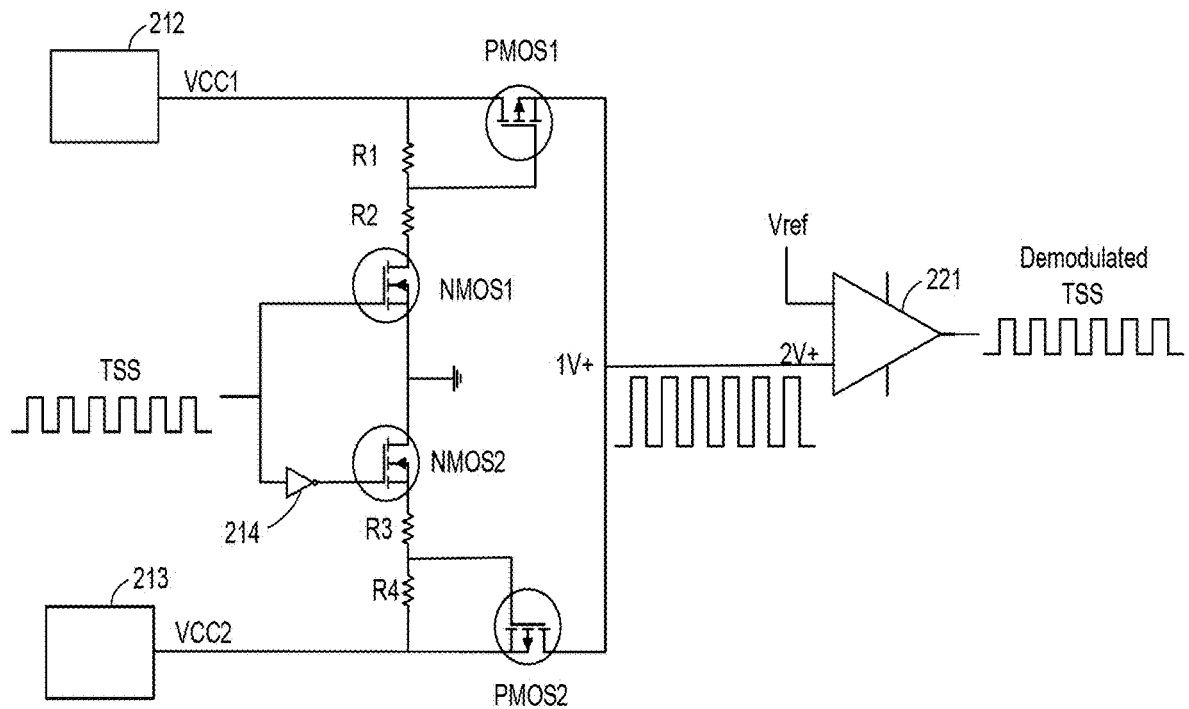
FIG. 2B is a schematic diagram illustrating circuits of the modulator and the demodulator according to the implementations of the present disclosure.

FIG. 2B is a schematic diagram illustrating circuits of the modulator and the demodulator according to the implementations of the present disclosure. As shown in FIG. 2B, the first switch 21 is a P-channel Metal Oxide Semiconductor, namely, PMOS1, and the first switch control unit comprises a first resistance R1, a second resistance R2 and an N-channel Metal Oxide Semiconductor, namely, NMOS1; and the second switch is a PMOS2, and the second switch control unit comprises a third resistance R3, a fourth resistance R4, an NMOS2 and an inverter. As shown in FIG. 2B, for the first switch 21, the gate of the PMOS1 is connected between the first resistance R1 and the second resistance R2, the source of the PMOS1 is connected to the first power supply 212, and the drain of the PMOS1 is connected to the power supply pin 1V+. As shown in FIG. 2B, for the second switch 23, the gate of the PMOS2 is connected between the third resistance R3 and the fourth resistance R4, the source of the PMOS2 is connected to the second power supply 213, and the drain of the PMOS2 is connected to the power supply pin 1V+.

As shown in FIG. 2B, for the first switch control unit 22, the first resistance R1, the second resistance R2, and the NMOS1 are serially connected between the first power supply 212 and the ground. The gate of the NMOS1 receives the TSS, the drain of the NMOS1 is connected to the second resistance R2, and the source of the NMOS1 is connected to the ground. When the TSS is at the high level, the NMOS1 is switched on, and electrical current thus flows through the first resistance R1 and the second resistance R2. At this time, the voltage VCC1 at the source of the PMOS1 is higher than the voltage at the gate of the PMOS1, which is the voltage at the point between the first resistance R1 and the second resistance R2, and thus, the PMOS1 is switched on to provide the first power voltage VCC1 to the power supply pin 1V+. When the TSS is at the lower level, the NMOS1 is switched off such that the PMOS1 is also switched off, and then the first power voltage VCC1 may not be supplied to the power supply pin 1V+.

As shown in FIG. 2B, for the second switch control unit 22, the third resistance R3, the fourth resistance R4, and the NMOS2 are serially connected between the second power supply 213 and the ground. The gate of the NMOS2 receives the TSS, the drain of the NMOS2 is connected to the third resistance R3, and the source of the NMOS2 is connected to the ground. As shown in FIG. 2B, an inverter 214 is connected between the second power supply 213 and the gate of the NMOS2. When the TSS is at the high level, due to the inverter, the gate of the NMOS2 receives a low level and is switched off such that the PMOS2 is also switched off such that the second power voltage VCC2 is not supplied to the power supply pin 1V+. When the TSS is at the low level, due to the inverter, the gate of the NMOS2 receives a high level and is switched on, and then electrical current thus flows through the third resistance R3 and the fourth resistance R4. At this time, the voltage VCC2 at the source of the PMOS2 is higher than the voltage at the gate of the PMOS2, which is the voltage at the point between the third resistance R3, and the fourth resistance R4. Thus, the PMOS2 is switched on to provide the second power voltage VCC2 to the power supply pin 1V+.

In the system for transmitting TSS according to the present disclosure, the modulated TSS is transmitted and received through the power pins of the USB interface on the AP and the power pins on the USB dongle device, respectively, and the modulated TSS signal is demodulated and extracted on the USB dongle device. Since the power pin is a physical component, it is located in the physical layer, on which the signal may be transmitted in real-time, without the need for higher layers such as the MAC layer, transport layer, or application layer to participate in the modulation and demodulation of the signal. Therefore, the modulation of TSS through the modulator, the transmission of the modulated TSS through the power pin, and the demodulation of the modulated TSS through the demodulator are all realized through physical components, and no special protocol is required to transmit, modulate, and demodulate the signal, so the delay of the demodulated TSS relative to the original TSS is fixed, low, and measurable.

Figure 3:
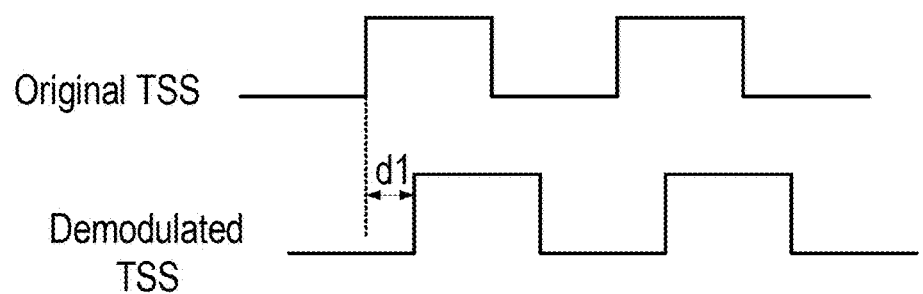
FIG. 3 is a schematic diagram illustrating a time delay between a demodulated time-sensitive signal and an original time-sensitive signal according to the implementations of the present disclosure.

As shown in FIG. 3, the delay d1 between the demodulated TSS from the demodulator and the original TSS input to the modulator may be measured. This delay may be compensated for in subsequent applications and processing. As shown in FIG. 3, in one example, the latency is about 100 ns, which is much less than the 2 microseconds or 17 microseconds specified in the protocols, and the demodulated TSS may be used for the time-sensitive network described above, such that the USB dongle device is substantially synchronized with the AP.

Figure 4A:
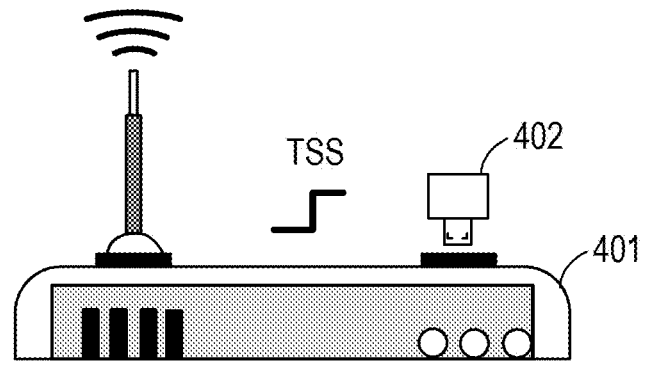
FIG. 4A is a schematic diagram illustrating an example of an application scenario to which implementations of the present disclosure applies.
Figure 4B:
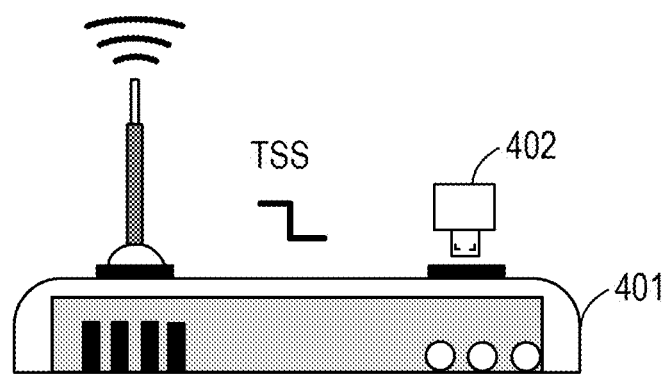
FIG. 4B is a schematic diagram illustrating another example of an application scenario to which implementations of the present disclosure applies.

FIG. 4A is a schematic diagram illustrating an example of an application scenario to which implementations of the present disclosure applies, and FIG. 4B is a schematic diagram illustrating another example of an application scenario to which implementations of the present disclosure applies. In these examples, the AP 401 may comprise a wireless transmitter, and the USB dongle device 402 may comprise a USB RF scanner. The USB RF scanner is plugged into the wireless transmitter, and the wireless transmitter and the USB RF scanner operate in the same frequency band, such as operating at the same 5.5 GHz frequency. When a wireless transmitter transmits a signal at a frequency or channel of 5.5 GHZ, the TSS becomes to be a high level so that the USB RF scanner stops working and is not able to receive signals from the same frequency band or channel, that is, it does not receive signals from the wireless transmitter closest to the USB RF scanner, thus not causing congestion in the scanner. That is, when the wireless transmitter sends a signal, the USB RF scanner does not receive the signal from the neighboring wireless transmitter to avoid congestion.

In another implementation, the USB RF scanner may be adapted to receive signals from other devices rather than the wireless transmitter at a frequency or channel of 5.5 GHZ and analyze the signal to analyze whether the signal is an attack signal to invade the network so as to achieve network protection. That is, the USB RF scanner may receive the signal of the same frequency band or channel from the remote device, so as to analyze whether the received signal is intruding into the network. When the wireless transmitter receives a signal at a frequency or channel of 5.5 GHZ, the TSS becomes to be a low level, allowing the USB RF scanner to work to receive signals in the same frequency band or channel from other devices rather than the wireless transmitter. That is, wireless transmitters and USB RF scanners are capable of receiving signals in the same frequency band or channel from other devices, and the USB RF scanner may recognize whether the received signal is the attach signal.

According to the disclosed system, the TSS may be transmitted from the AP to the USB RF scanner with very low latency so that the high level of the TSS may disable the USB RF scanner in time, so that the USB RF scanner may stop receiving signals from nearby APs as soon as they start sending signals, thereby preventing channel congestion. In addition, the low level of the TSS enables the USB RF scanner in time, so that after the nearby AP starts receiving signals from the other devices, the USB RF scanner may also immediately receive signals from the other devices and analyze and determine whether these signals are attack signals, so as to protect the network in time.

Figure 5:
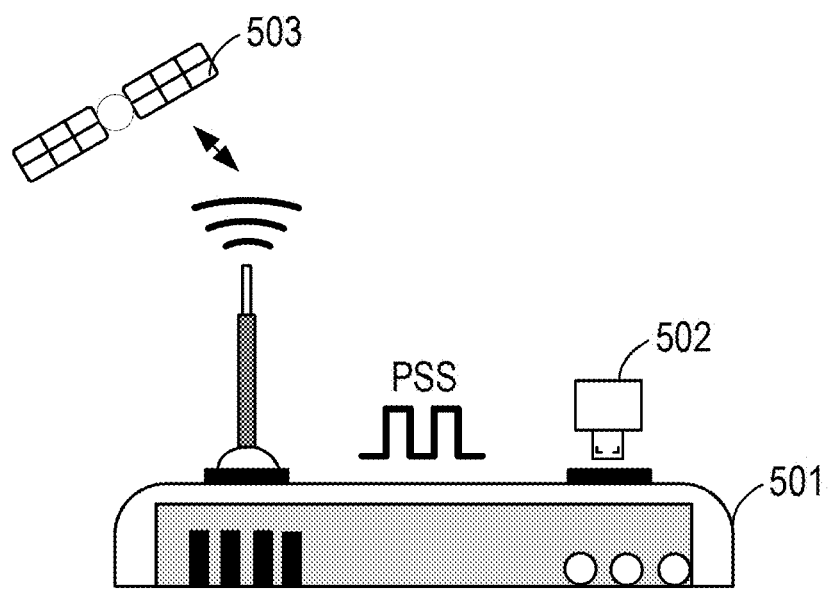
FIG. 5 is a schematic diagram illustrating a further example of an application scenario to which implementations of the present disclosure applies.

FIG. 5 is a schematic diagram illustrating a further example of an application scenario to which implementations of the present disclosure applies. Recently, 5G and Wi-Fi 7 applications are driving the evolution of TSN networks from wired to wireless networks. At present, the time synchronization process between wireless devices generally involves the MAC or higher-layer protocols, and baseband commodity chips help achieve precision synchronization between AP and USB dongle devices in about 10 microseconds. This accuracy of about 10 microseconds will limit many Wi-Fi 7 and TSN-related applications, which need accuracy of less than 1 microsecond.

As shown in FIG. 5, the AP 501 is deployed with an outdoor-based Global Navigation Satellite System (GNSS) receiver (not shown) for positioning in Wi-Fi 6E products and in IEEE 1588 to improve positioning accuracy. The AP 501, having the GNSS receivers, may be deployed in strategic locations with clear satellite visibility, so as to acquire satellite signals from the satellites 503. The GNSS receivers utilize signals from global navigation satellite systems such as the Global Positioning System (GPS) to determine their precise location and time. Then, the GNSS receivers may extract highly accurate time information from the acquired satellite signals and may share this precise time with the USB dongle devices plugged into the AP. Then the USB dongle device 502 may adjust their local clocks based on the GNSS-referenced time.

According to the system of the present disclosure, the AP 501 may obtain an original pulse per second (PPS) signal as the TSS, and generate a modulated signal based on the original PPS signal by using the modulator. Then, the AP 501 may transmit the modulated signal to the USB dongle device 502 via the power pins. After receiving the modulated signal, the USB dongle device 502 may demodulate the received modulated signal, and obtain a target PPS signal to implement time synchronization. In this way, the wireless devices (such as the USB dongle devices) which cannot receive GPS signals can synchronize their clocks with the host wireless device (such as the AP) without supporting PTP protocols. The cost of devices in the network supporting 1588 protocol (i.e., PTP protocol) is quite expensive, and the delay of the synchronization by using the PTP protocol between the AP and the USB dongle device is around 10 microseconds, which is much larger than 100 ns obtained by the system of the present disclosure. By the system of the present disclosure, the accuracy of the time synchronization may be improved, and the cost for the entire network may be reduced.

Since the operation of the present disclosure does not involve MAC or upper-layer delay, it is a purely physical method and does not require software, so it can achieve sub-microsecond accuracy (for example, 100 ns). This disclosure transmits information only through hardware and achieves sub-microsecond accuracy, such as a delay of approximately 100 ns between the demodulated TSS or PPS signal and the received original TSS or PPS signal, which is appropriate for most time-sensitive networks.

In the context of this disclosure, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable subcombination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A system comprising:
an access point (AP) configured to generate a time sensitive signal (TSS), the AP comprising a modulator configured to obtain the TSS and two power voltages and modulate the TSS with the two power voltages to generate a modulated TSS; and
a universal serial bus (USB) dongle device operating at the same frequency with the AP and configured to be inserted into a USB interface of the AP, the USB dongle device comprising a demodulator configured to demodulate the modulated TSS to obtain the demodulated TSS,
wherein the modulated TSS is transmitted from the modulator to the demodulator via a power supply pin at the USB interface of the AP and a power reception pin of the USB dongle device.

2. The system of claim 1, wherein the TSS comprises a first level and a second level, and
the modulator comprises:
a first circuit configured to receive the TSS and a first power voltage of the two power voltages and provide the first power voltage to the power supply pin in response to the first level of the TSS; and
a second circuit configured to receive the TSS and a second power voltage of the two power voltages and provide the second power voltage to the power supply pins in response to the second level of the TSS.

3. The system of claim 2, further comprising a first power supply for providing the first power voltage and a second power supply for providing the second power voltage.

4. The system of claim 3, wherein:
the first circuit comprises:
a first switch connected between the first power supply and the power supply pin; and
a first switch control unit configured to receive the TSS and switch on the first switch to provide the first power voltage to the power supply pin in response to the first level of the TSS; and
the second circuit comprises:
a second switch connected between the second power supply and the power supply pin; and
a second switch control unit configured to receive the TSS and switch on the second switch to provide the second power voltage to the power supply pin in response to the second level of the TSS.

5. The system of claim 4, wherein the first switch control unit comprises a first resistance, a second resistance and a first control switch connected in series between the first power supply and a ground, wherein the first switch is connected to the first switch control unit between the first resistance and the second resistance, and the first control switch is configured to receive the TSS and to be turned on in response to the first level of the TSS; and
the second switch control unit comprises a third resistance, a fourth resistance and a second control switch connected in series between the second power supply and the ground, wherein the second switch is connected to the second switch control unit between the third resistance and the fourth resistance, and the second control switch is configured to receive the TSS and to be turned on in response to the second level of the TSS.

6. The system of claim 5, wherein the first control switch comprises a first N-channel Metal Oxide Semiconductor (NMOS), and the second control switch comprises a second NMOS and an inverter connected to a gate of the second NMOS.

7. The system of claim 4, wherein the first switch comprises a first P-channel Metal Oxide Semiconductor (PMOS), and the second switch comprises a second PMOS.

8. The system of claim 2, wherein the AP is configured to transmit a signal to a third device in response to the first level of the TSS, and receive a signal from the third device in response to the second level of the TSS; and the USB dongle device comprises a USB radio frequency scanner, wherein the USB radio frequency scanner is configured to be disabled to refrain receiving signals from the AP in response to the first level of the demodulated TSS, and to be enabled to receive signals from the third device in response to the second level of the demodulated TSS.

9. The system of claim 1, wherein the demodulator comprises a comparator, a first input of the comparator is connected to the power reception pin, and a second input thereof is connected to a reference voltage, and wherein the reference voltage is between the first power voltage and the second power voltage.

10. The system of claim 1, further comprising a voltage regulator on the USB dongle device connected to the power reception pin to receive the modulated TSS and configured to regulate the first power voltage and the second power voltage to a constant voltage.

11. The system of claim 10, further comprising a system on chip (SOC) configured to be powered by the constant voltage and receive the demodulated TSS.

12. The system of claim 1, wherein the USB dongle device comprises at least one of a USB radio frequency scanner or a USB ultra-bandwidth device.

13. The system of claim 1, wherein the TSS comprises a pulse per second (PPS) signal to be transmitted from the AP to the USB dongle device for time synchronization.

14. An electronic device comprising:

a modulator configured to obtain a time sensitive signal (TSS) and two power voltages and modulate the TSS with the two power voltages to generate a modulated TSS; and a a demodulator configured to receive and demodulate the modulated TSS to obtain the demodulated TSS, wherein the modulate is adapted to be mounted on a first device for providing the TSS and the two power voltages, and the demodulator is adapted to be mounted on a second device inserted into the first device, and the modulated TSS is transmitted from the modulator to the demodulator via a first power pin of the first device and a second power pin of the second device.

15. The electronic device of claim 14, wherein the first device comprises an access point (AP), and the second device comprises a universal serial bus (USB) dongle device inserted into a USB interface of the AP, and the first power pin comprises a power supply pin of the USB interface, and the second power pin comprises a power reception pin of the USB dongle device.

16. The electronic device of claim 14, wherein the TSS comprises a first level and a second level, and the modulator comprises:

a first circuit configured to receive the TSS and a first power voltage of the two power voltages and provide the first power voltage to the first power pin in response to the first level of the TSS; and a second circuit configured to receive the TSS and a second power voltage of the two power voltages and provide the second power voltage to the first power pins in response to the second level of the TSS.

17. The electronic device of claim 16, wherein:

the first circuit comprises:

a first switch connected to the first power pin and configured to receive the first power voltage; and a first switch control unit configured to receive the TSS and switch on the first switch to provide the first power voltage to the first power pin in response to the first level of the TSS; and the second circuit comprises:

a second switch connected to the first power pin and configured to receive the second power voltage; and a second switch control unit configured to receive the TSS and switch on the second switch to provide the second power voltage to the first power pin in response to the second level of the TSS.

18. The electronic device of claim 17, wherein the first switch control unit comprises a first resistance, a second resistance and a first control switch connected in series, wherein the first switch is connected to the first switch control unit between the first resistance and the second resistance, and the first control switch is configured to receive the TSS and to be turned on in response to the first level of the TSS; and the second switch control unit comprises a third resistance, a fourth resistance and a second control switch connected in series, wherein the second switch is connected to the second switch control unit between the third resistance and the fourth resistance, and the second control switch is configured to receive the TSS and to be turned on in response to the second level of the TSS.

19. The electronic device of claim 18, wherein the first switch comprises a first P-channel Metal Oxide Semiconductor (PMOS) and the second switch comprises a second PMOS; and wherein the first control switch comprises a first N-channel Metal Oxide Semiconductor (NMOS), and the second control switch comprises a second NMOS and an inverter connected to a gate of the second NMOS.

20. The electronic device of claim 14, wherein the demodulator comprises a comparator, a first input of the comparator is connected to the second power pin, and a second input thereof is connected to a reference voltage, and wherein the reference voltage is between a first power voltage and a second power voltage of the two power voltages.

* * * * *